United States Patent
Tatani et al.

[11] Patent Number: 5,879,639
[45] Date of Patent: Mar. 9, 1999

[54] WET FLUE GAS DESULFURIZATION SYSTEM

[75] Inventors: Atsushi Tatani; Kiyoshi Okazoe; Yoshio Nakayama; Koichiro Iwashita, all of Tokyo, Japan

[73] Assignee: Mitsubishi Jukogyn Kabushiki Kaisha, Tokyo, Japan

[21] Appl. No.: 761,859

[22] Filed: Dec. 9, 1996

[30] Foreign Application Priority Data

Feb. 6, 1996 [JP] Japan ................................. 8-019872

[51] Int. Cl.$^6$ .......................... B01D 53/50; B01D 53/14
[52] U.S. Cl. ........................ 422/168; 96/265; 96/290; 96/332; 422/177; 422/231; 422/234
[58] Field of Search ........................ 55/220, 223, 228, 55/229, 255, 257.1, 258, 256; 95/187, 189, 195–197, 205, 211, 235; 425/67, 69, 145; 264/179; 422/168, 177, 178, 225, 227, 231–234; 423/242.1

[56] References Cited

U.S. PATENT DOCUMENTS

| | | | |
|---|---|---|---|
| 2,142,406 | 1/1939 | Nonhebel et al. | 422/234 X |
| 2,413,102 | 12/1946 | Ebert et al. | 264/179 |
| 2,450,750 | 10/1948 | De Lacotte et al. | 425/67 |
| 2,737,997 | 3/1956 | Himmelheber et al. | 425/145 |
| 3,023,089 | 2/1962 | Graves, Jr. et al. | 422/225 X |
| 3,450,529 | 6/1969 | McDonald | 425/145 |
| 3,607,101 | 9/1971 | Cochran | 422/225 |
| 4,102,657 | 7/1978 | Mehta | 422/168 X |
| 4,195,062 | 3/1980 | Martin et al. | 422/234 X |
| 4,204,844 | 5/1980 | Pilat | 55/229 |
| 4,229,417 | 10/1980 | Kanai et al. | 422/227 X |
| 4,366,142 | 12/1982 | Kojima et al. | 422/225 X |
| 4,436,703 | 3/1984 | Lane | 422/232 X |
| 4,533,522 | 8/1985 | Leimkühler | 422/234 X |
| 4,670,221 | 6/1987 | Marnet et al. | 422/168 X |
| 4,876,076 | 10/1989 | Colley | 422/234 X |
| 4,915,914 | 4/1990 | Morrison | 422/168 |
| 4,986,966 | 1/1991 | Lehto | 55/257.1 |
| 5,186,948 | 2/1993 | Takei | 425/69 |
| 5,209,905 | 5/1993 | Onizuka et al. | 422/168 |
| 5,512,265 | 4/1996 | Funahashi et al. | 422/231 X |
| 5,605,552 | 2/1997 | Shimizu et al. | 422/231 X |
| 5,620,667 | 4/1997 | Nemoto et al. | 422/234 X |
| 5,641,460 | 6/1997 | Okazoe et al. | 422/234 X |

FOREIGN PATENT DOCUMENTS

| | | |
|---|---|---|
| 0162536 | 2/1985 | European Pat. Off. . |
| 0 298 039A2 | 6/1988 | European Pat. Off. . |
| 2-56130 | 11/1990 | Japan . |
| 7275651 | 10/1995 | Japan . |
| 2154468 | 2/1985 | United Kingdom . |
| 2296490 | 5/1995 | United Kingdom . |

Primary Examiner—Robert Spitzer
Attorney, Agent, or Firm—Bell Seltzer Intellectual Property Law Group of Alston & Bird LLP

[57] ABSTRACT

A wet flue gas desulfurization system for removing sulfur dioxide present in flue gas by absorption into an absorbent slurry includes an absorption tower having at a bottom thereof a tank for holding an absorbent slurry; a circulating pump for feeding the absorbent slurry within the tank to a flue gas inlet section in an upper part of the absorption tower and bringing the absorbent slurry into contact with flue gas; and a slurry preparation compartment provided on one side of the tank of the absorption tower and separated from a flue gas passage section by a partition wall having its lower end submerged below a surface of the absorbent slurry, whereby an absorbent and water constituting the absorbent slurry are directly introduced into the slurry preparation compartment.

3 Claims, 4 Drawing Sheets

WET FLUE GAS DESULFURIZATION SYSTEM

BACKGROUND OF THE INVENTION

1. Field of the Invention

This invention relates to a wet flue gas desulfurization system wherein flue gas from thermal electric power plants and the like is brought into contact with an absorbent slurry whereby sulfur dioxide present therein is absorbed and removed. More particularly, it relates to a wet flue gas desulfurization system using an improved method for supplying an absorbent slurry to the absorption tower.

2. Description of the Related Art

In recent years, wet flue gas desulfurization systems of the commonly referred to in-situ oxidation type have become popular. In these systems, the necessity of an oxidation tower is eliminated by supplying air to the tank of an absorption tower so that an absorbent slurry (usually containing a calcium compound such as limestone) having sulfur dioxide absorbed therein may be oxidized by contact with air to form gypsum as a by-product. FIG. 4 is a schematic view illustrating an example of a wet lime-gypsum desulfurization system of this type.

As illustrated in FIG. 4, this system is equipped with an air sparger 3 of the commonly referred to rotating arm type which blows oxidizing air in the form of fine bubbles while agitating the slurry in a tank 2. Thus, the absorbent slurry having sulfur dioxide absorbed therein is brought into efficient contact with the air within tank 2 to be oxidized completely and thereby form gypsum.

More specifically, in this system, untreated flue gas A is introduced into a flue gas inlet section 1a of an absorption tower 1 and brought into contact with an absorbent slurry injected from header pipes 5 by means of a circulating pump 4 whereby sulfur dioxide present in untreated flue gas A is absorbed and removed. The resulting flue gas is discharged as treated flue gas B from a flue gas outlet section 1b. The absorbent slurry injected from header pipes 5 flows downward through a layer of packing material 6 while absorbing sulfur dioxide, and enters tank 2 where it is oxidized by contact with a large number of air bubbles blown in and agitated by air sparger 3, and then undergoes a neutralization reaction to form gypsum. The predominant reactions occurring in the course of these treatments are represented by the following reaction formulas (1) to (3).

(Flue gas inlet section of absorption tower)

$$SO_2 + H_2O \rightarrow H^+ + HSO_3^- \quad (1)$$

(Tank)

$$H^+ + HSO_3^- + 1/2 O_2 \rightarrow 2H^+ + SO_4^{2-} \quad (2)$$

$$2H^+ + SO_4^{2-} + CaCO_3 + H_2O \rightarrow CaSO_4 \cdot 2H_2O + CO_2 \quad (3)$$

Thus, the slurry within tank 2 comes to have suspended therein gypsum and a small amount of limestone used as absorbent. In this case, the slurry is withdrawn through a pipe line branching off from the delivery pipe of circulating pump 4, and fed to a solid-liquid separator 7 where it is filtered and recovered as gypsum C having a low water content (usually of about 10%). On the other hand, the filtrate from solid-liquid separator 7 is conveyed to a filtrate tank 8, stored temporarily therein, and suitably supplied to a slurry preparation tank 10 as feed water for the preparation of an absorbent slurry by means of a pump 9.

Slurry preparation tank 10 has a stirrer 11, by which limestone (absorbent) introduced thereinto from a limestone silo 12 by means of a conveyor 13 and water supplied by means of the aforesaid pump 9 are mixed and stirred to form an absorbent slurry. The resulting absorbent slurry is suitably withdrawn by means of a slurry pump 14 and fed to the tank 2 of absorption tower 1.

During the operation of this slurry preparation tank 10, the amount of water introduced thereinto is regulated, for example, by means of a controller and a flow control valve (not shown). Moreover, limestone is supplied thereto in an appropriate amount corresponding to the amount of water introduced, by controlling the operation of the rotary valve 12a of limestone silo 12. Thus, slurry preparation tank 10 is maintained in such a state that an absorbent slurry having a predetermined concentration (for example, of about 20% by weight) is always stored on a level within certain limits.

In addition, make-up water (i.e., industrial water or the like) is suitably supplied, for example, to the aforesaid filtrate tank 8. Thus, the water gradually lost, for example, by evaporation in absorption tower 1 is made up for.

Moreover, in order to maintain a high degree of desulfurization and a high purity of gypsum during operation, the sulfur dioxide concentration in untreated flue gas A, and the pH and limestone concentration and like of the slurry within tank 2 are detected with sensors, and the feed rate of limestone and the feed rate of the absorbent slurry are suitably regulated by means of controllers (not shown).

Furthermore, during operation, the temperature of the slurry within the tank 2 of absorption tower 1 is steadily maintained at about 50° C. owing to the heat of the flue gas and the heat of reaction evolved in the aforesaid reactions.

In the above-described conventional wet flue gas desulfurization system, a pit for the preparation of an absorbent slurry (i.e., slurry preparation tank 10) and components attached thereto (e.g., stirrer 11, slurry pump 14, and the pipe line extending from slurry pump 14 to tank 2) are required. Consequently, there has been a limit to the simplification of the equipment which tends to be more and more eagerly desired in recent years.

Accordingly, as a means for simplifying such systems, the present inventors have already proposed a dry feed mechanism in which limestone used as absorbent is conveyed from the silo to the absorption tower by pneumatic conveyance (as described, for example, in Japanese Patent Publication No. 56130/'90). This mechanism makes it possible to eliminate the pit for the preparation of an absorbent slurry.

However, even if this mechanism is employed, a compressor and a limestone conveying line for pneumatic conveyance are still required. Accordingly, there is a need for further simplification of the equipment.

SUMMARY OF THE INVENTION

The present invention has been made in view of the above-described existing state of the prior art, and an object thereof is to provide a wet flue gas desulfurization system wherein the absorbent supply system is improved to achieve a marked simplification of the equipment.

In order to accomplish the above object, the present invention provides:

(1) A wet flue gas desulfurization system for removing sulfur dioxide present in flue gas by absorption into an absorbent slurry, which comprises an absorption tower having at the bottom thereof a tank for holding an absorbent slurry; a circulating pump for feeding the absorbent slurry within the tank to a flue gas inlet section in the upper part of the absorption tower and bringing the absorbent slurry into contact with flue gas; and a slurry preparation compartment provided on one side of the tank of the absorption tower and separated from the flue gas passage section by a partition wall having its lower end submerged below the surface of the absorbent slurry, whereby an absorbent and water constituting the absorbent slurry are directly introduced into the slurry preparation compartment.

(2) A wet flue gas desulfurization system as described above in (1) wherein a vent pipe having an open upper end is provided at the top of the slurry preparation compartment.

(3) A wet flue gas desulfurization system as described above in (1) or (2) wherein a nozzle for injecting water constituting the absorbent slurry into the slurry preparation compartment is provided.

(4) A wet flue gas desulfurization system as described above in (3) wherein the direction of injection of the nozzle is determined so as to be parallel to an inner sidewall of the slurry preparation compartment.

According to the present invention, a wet flue gas desulfurization system is constructed so that, on one side of the tank of the absorption tower, there is provided a slurry preparation compartment separated from the flue gas passage section by a partition wall having its lower end submerged below the surface of the absorbent slurry, whereby an absorbent and water constituting the absorbent slurry are directly introduced into the slurry preparation compartment. Thus, a large number of conventionally required devices and components, including the absorbent slurry preparation tank, the stirrer, the slurry pump, and the pipe line extending from the slurry pump to the absorption tower, can be totally eliminated to achieve a marked simplification of the equipment. The partition wall used in the system of the present invention to separate the slurry preparation compartment from the tank functions to prevent the introduced absorbent from coming into contact with water vapor produced in the absorbent tower and flue gas passing therethrough, and thereby suppresses the phenomenon in which the introduced limestone absorbs moisture as a result of contact with such water vapor or flue gas and settles in the form of lumps.

Moreover, when a vent pipe having an open upper end is provided at the top of the slurry preparation compartment, the water vapor produced in the slurry preparation compartment is discharged, so that the introduced limestone scarcely comes into contact with such water vapor produced in the slurry preparation compartment. As a result, the phenomenon in which limestone powder is deposited as wet adherent scale in the neighborhood of the inlet port can be more positively prevented to achieve a smoother supply of the absorbent and thereby secure higher reliability of the entire system.

Furthermore, when a nozzle for injecting water constituting the absorbent slurry into the slurry preparation compartment is provided, the slurry within the slurry preparation compartment is agitated by the flow of the injected water, so that the solid component (i.e., limestone) is restrained from precipitating to the bottom of the slurry preparation compartment. Consequently, the phenomenon in which the introduced limestone precipitates and settles in the slurry preparation compartment can be more positively prevented to achieve a smoother supply of the absorbent and thereby secure higher reliability of the entire system.

Especially when the direction of injection of the nozzle is determined so as to be parallel to an inner sidewall of the slurry preparation compartment, a swirling and strong stream of water is efficiently produced in the slurry preparation compartment, resulting in essentially no precipitation of the limestone. Thus, the above-described effect becomes more pronounced.

DETAILED DESCRIPTION OF PREFERRED EMBODIMENTS

One example of the present invention is more specifically described hereinbelow with reference to the accompanying drawings.

Figure 1:
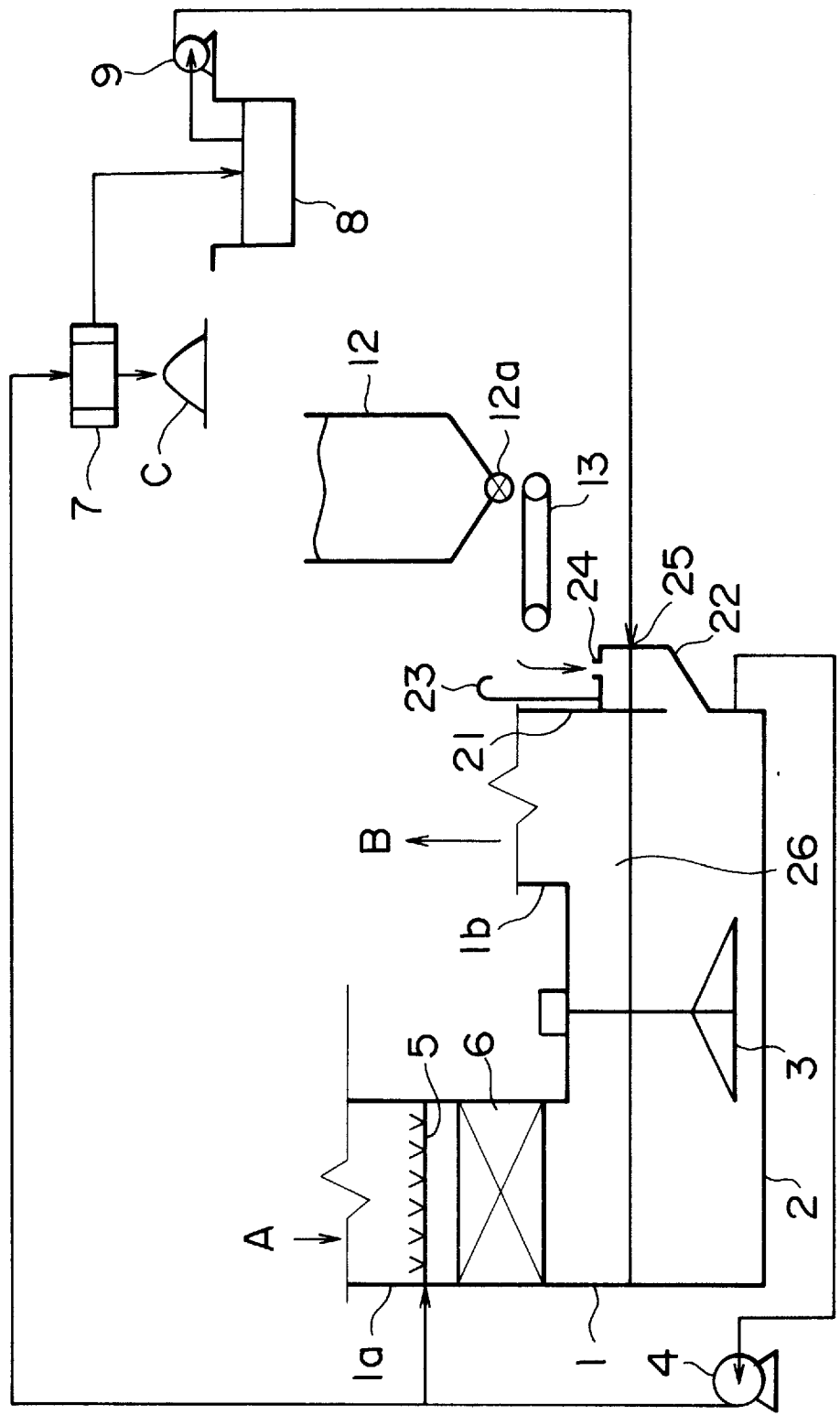
FIG. 1 is a schematic view illustrating the overall construction of a wet flue gas desulfurization system in accordance with one example of the present invention.
Figure 2:
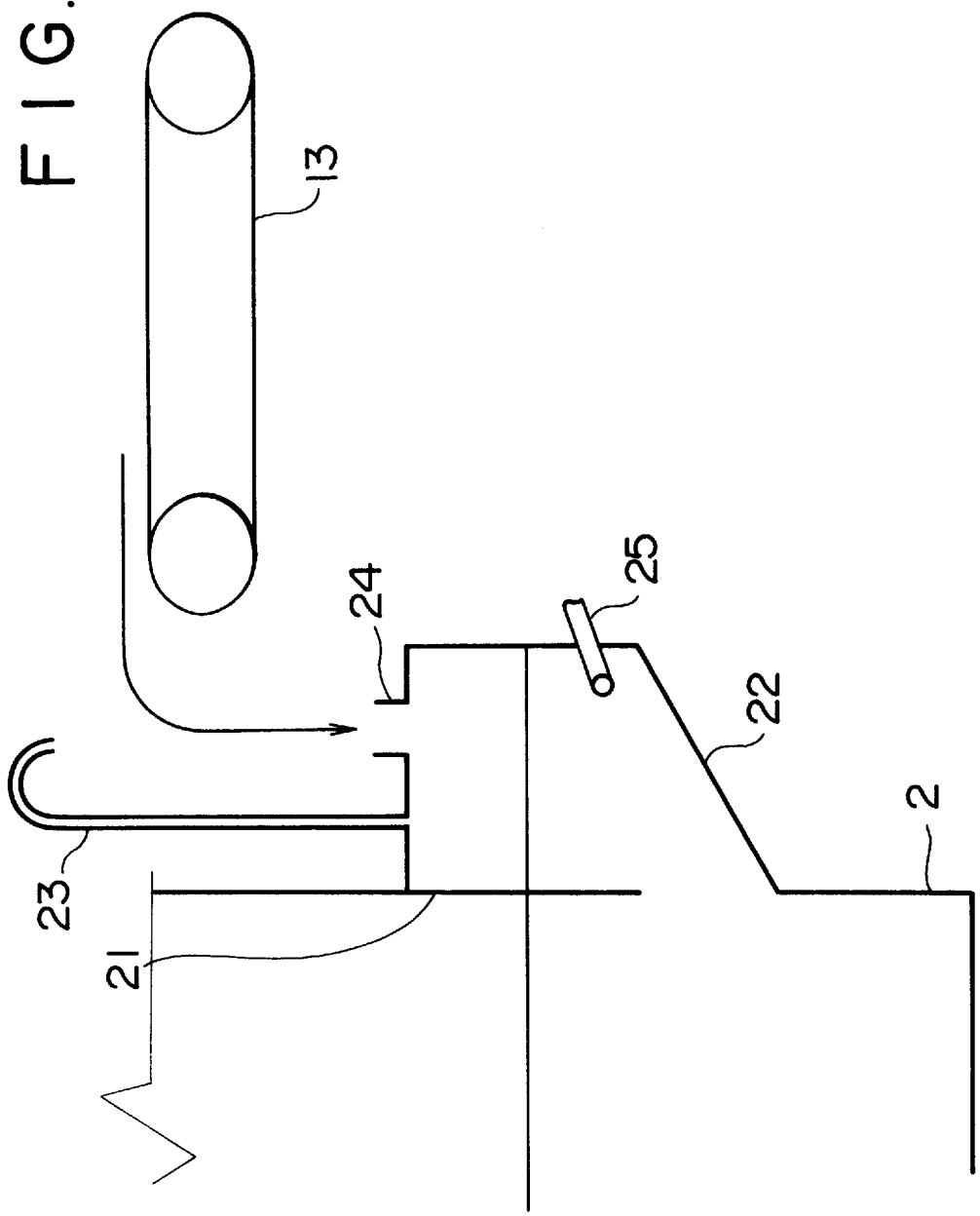
FIG. 2 is an enlarged side view illustrating an essential part of the wet flue gas desulfurization system of FIG. 1.
Figure 3:
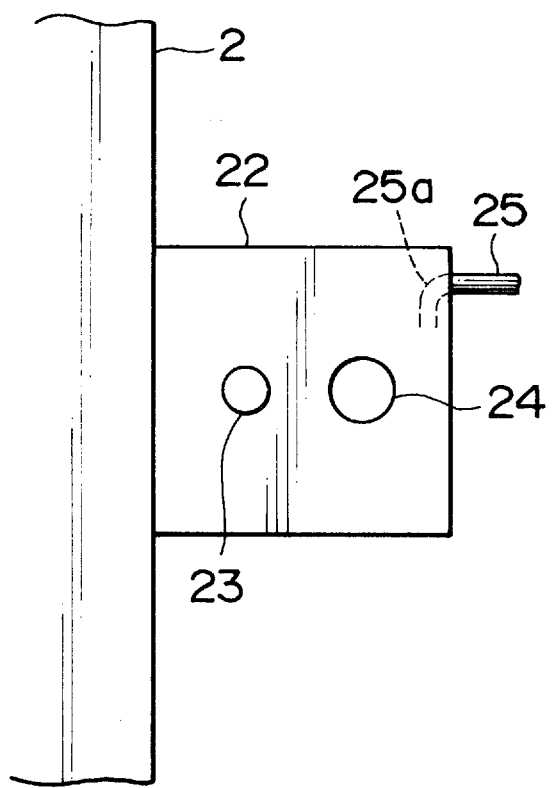
FIG. 3 is an enlarged plan view illustrating a characteristic part of the wet flue gas desulfurization system of FIG. 1.

FIG. 1 is a schematic view illustrating the overall construction of a wet flue gas desulfurization system in accordance with this example, and FIGS. 2 and 3 are enlarged side and plan views, respectively, illustrating an essential part (i.e., a slurry preparation compartment and the like) of the system.

Figure 4:
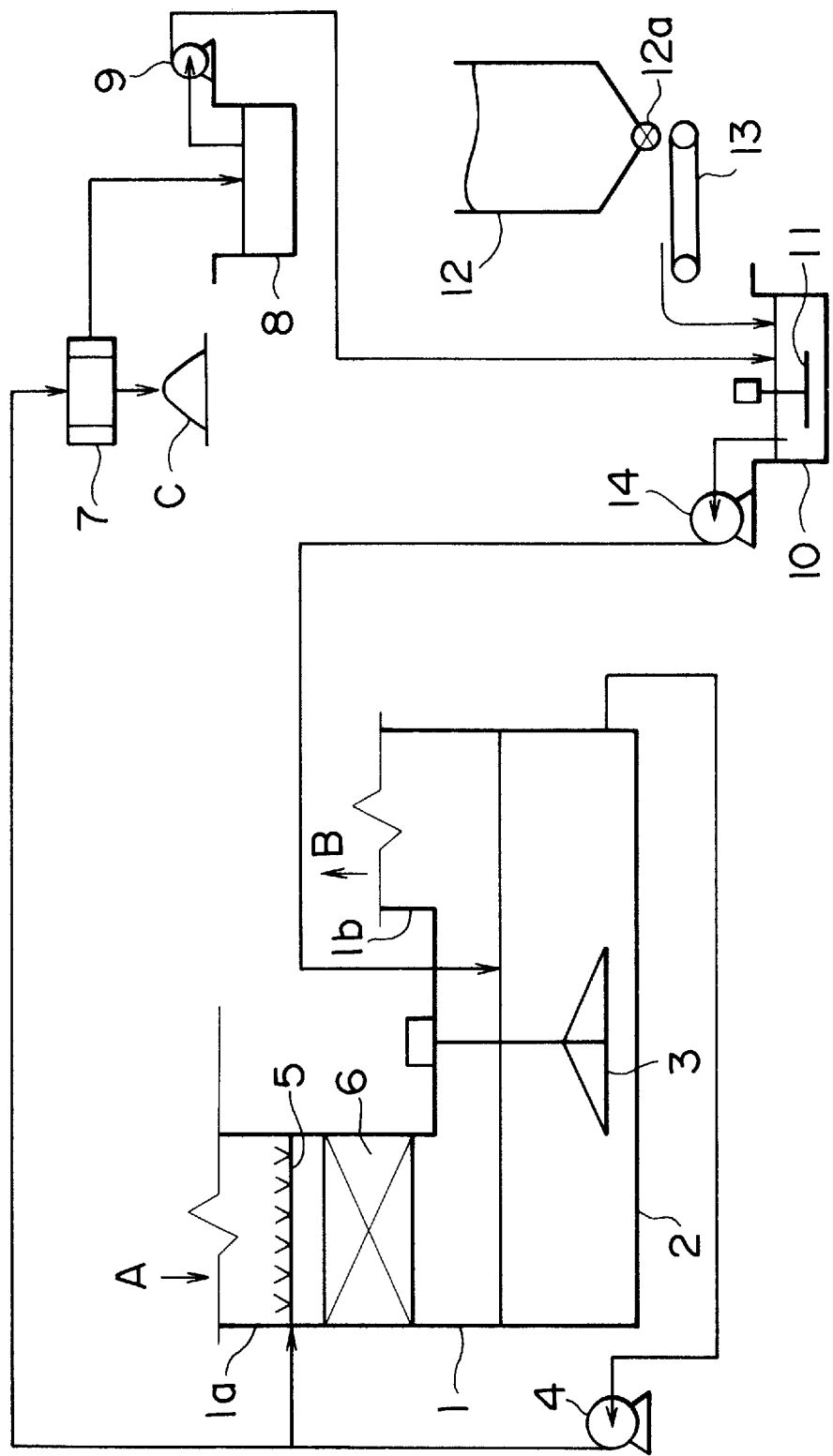
FIG. 4 is a schematic view illustrating the overall construction of a conventional wet flue gas desulfurization system.

In the following description, the same elements as described above in connection with the conventional wet flue gas desulfurization system illustrated in FIG. 4 are designated by the same reference numerals, and therefore, the explanation for those is commonly omitted.

As illustrated in FIG. 1, the wet flue gas desulfurization system of this example is constructed so that, on one side of the tank 2 of absorption tower 1, there is provided a slurry preparation compartment 22 separated from flue gas passage section 26 by a partition wall 21 having its lower end submerged below the surface of the absorbent slurry, whereby limestone (absorbent) and water constituting the absorbent slurry are directly introduced into this slurry preparation compartment 22.

In this example, slurry preparation compartment 22 has a square shape in the horizontal section as illustrated in FIG. 3, and the bottom wall thereof slopes down toward the center of tank 2 as illustrated in FIG. 2. This slurry preparation compartment 22 communicates with the internal space of tank 2 by an opening defined under partition wall 21 (below the surface of the slurry).

Tank 2 may have, for example, a size of about 14 m square in horizontal section, while slurry preparation compartment 22 may have a size of about 2.5 m square in horizontal section.

The top wall of this slurry preparation compartment 22 is provided with a vent pipe 23 and a limestone inlet port 24. Moreover, as illustrated in FIGS. 2 and 3, a water supply pipe 25 connected to the delivery side of pump 9 is provided in a sidewall of this slurry preparation compartment 22.

In order to discharge the water vapor produced in slurry preparation compartment 22 on the basis of the so-called chimney effect, vent pipe 23 extends upward to a sufficient height and has an upper end open to the atmosphere.

In this example, the end part of water supply pipe 25 is bent so as to be parallel to an inner sidewall of slurry preparation compartment 22, and forms a nozzle 25a for injecting the water delivered by pump 9.

In the wet flue gas desulfurization system constructed in the above-described way, limestone used as absorbent and water within filtrate tank 8 are directly introduced into the tank 2 of absorption tower 1 by way of slurry preparation compartment 22. Moreover, the phenomenon in which limestone powder agglomerates into lumps and settles to the bottom of slurry preparation compartment 22, and the phenomenon in which limestone powder is deposited as wet adherent scale in the neighborhood of limestone inlet port 24 can be positively prevented, so that the absorbent slurry can be supplied smoothly. This makes it possible to perform a satisfactory operation while maintaining a high degree of desulfurization and a high purity of gypsum which are similar to those achievable in the prior art.

More specifically, limestone dispensed from silo 12 by means of rotary valve 12a is conveyed on conveyor 13 and introduced into slurry preparation compartment 22 through inlet port 24. In this process, the introduced limestone scarcely comes into contact with the water vapor and flue gas within absorption tower 1 owing to the functions of partition wall 21. Moreover, in this example, the introduced limestone scarcely comes into contact with the water vapor produced in slurry preparation compartment 22, owing to the chimney effect exerted by vent pipe 23.

Furthermore, in this example, water within filtrate tank 8 is supplied by injecting it from the tip (i.e., nozzle 25a) of the aforesaid water supply pipe 25 into the internal space of slurry preparation compartment 22 under the delivery pressure of pump 9. Consequently, the resulting stream of water serves to agitate the fluid within slurry preparation compartment 22, so that the solid component (i.e., limestone) is restrained from precipitating to the bottom of slurry preparation compartment 22. Especially in this example wherein the direction of injection of the aforesaid nozzle 25a is determined so as to be parallel to an inner sidewall of slurry preparation compartment 22, a swirling and strong stream of water is efficiently produced in slurry preparation compartment 22, resulting in essentially no precipitation of limestone.

Thus, the phenomenon in which the introduced limestone absorbs moisture as a result of contact with water vapor and flue gas, or precipitates, to agglomerate into lumps and settle within slurry preparation compartment 22, and the phenomenon in which limestone powder is deposited as wet adherent scale in the neighborhood of limestone inlet port 24 can be prevented with almost complete certainty.

Although this system is constructed so that limestone is directly introduced into tank 2, the functions of the slurry within tank 2 remain unchanged. Consequently, the degree of desulfurization and the purity of gypsum are maintained on a high level which has been achievable in the prior art.

The reason for this is that, even if some of the introduced limestone settles in slurry preparation compartment 22, the limestone slips down on the bottom surface of slurry preparation compartment 22 and flows into the internal space of tank 2 where it is eventually dispersed thoroughly by a powerful and vigorous agitating stream of water produced by the agitator installed within tank 2 (in this case, rotating arm type air sparger 3). This fact has been confirmed by trial runs made by the present inventors on testing equipment.

Thus, the wet flue gas desulfurization system of this example is constructed so that limestone and the filtrate are directly supplied to absorption tower 1. Consequently, a large number of conventionally required devices and components, including the absorbent slurry preparation tank, the stirrer, the slurry pump, and the pipe line extending from the slurry pump to the absorption tower, can be totally eliminated to achieve a marked simplification of the equipment.

Moreover, in this example, vent pipe 23 is provided to discharge the water vapor produced in the slurry preparation compartment 22, and feed water is injected from water supply pipe 25 to produce an effectively agitating stream of water in slurry preparation compartment 22. This serves not only to achieve a smoother supply of the absorbent and thereby secure higher reliability, but also to eliminate the necessity for an agitator installed within slurry preparation compartment 22, resulting in a further simplification of the equipment.

The present invention is not limited to the above-described example, but may be practiced in various ways. For example, a small-sized agitator may be installed within slurry preparation compartment 22. Even in this case, the absorbent slurry preparation tank, the pipe line for conveying the absorbent slurry, and the like can be eliminated to achieve a simplification of the equipment. Moreover, slurry preparation compartment 22 may have, for example, a cylindrical shape.

Furthermore, vent pipe 23 and water supply pipe 25 are not necessarily required. For example, under temperature conditions which cause little water vapor to be produced, vent pipe 23 need not be provided. Moreover, when an agitator as described above is installed, a simple water inlet port may be provided in place of the aforesaid water supply pipe 25.

It is to be understood that the present invention can also be applicable to various other types of absorption towers such as spray towers, packed grid towers, liquid column type absorption towers and gas dispersion type absorption towers. Moreover, the present invention can be applied not only to wet flue gas desulfurization systems of the in-situ oxidation type, but also to wet flue gas desulfurization systems of a type in which an oxidation tower is installed separately from the absorption tower.

We claim:

1. A wet flue gas desulfurization system for removing sulfur dioxide present in flue gas by absorption into an absorbent slurry, which comprises an absorption tower having at a bottom thereof a tank for holding an absorbent slurry and a flue gas passage section in an upper portion thereof; a circulating pump for feeding said absorbent slurry within the tank to a flue gas inlet section in an upper part of said absorption tower and bringing said absorbent slurry into contact with flue gas; and a slurry preparation compartment provided on one side of the tank of said absorption tower and separated from the flue gas passage section by a partition wall, the partition wall having its lower end submerged below a surface of said absorbent slurry; an absorbent supply adapted and arranged to supply an absorbent in its solid form directly into said slurry preparation compartment, said slurry preparation compartment being generally closed at the top and including a vent pipe having an open upper end terminating in ambient atmosphere at the top thereof for removing water vapor from said slurry preparation compartment; a water supply adapted and arranged to supply water directly into said slurry preparation compartment, said water supply comprising a nozzle for injecting water into said slurry preparation compartment, wherein the direction of injection of said nozzle is determined so as to be parallel to an inner sidewall of said slurry preparation compartment; and wherein said tank comprises an agitator for agitating said absorbent slurry.

2. A wet flue gas desulfurization system as claimed in claim 1 wherein said lower end of said slurry preparation compartment comprises a downwardly sloping bottom wall.

3. A wet flue gas desulfurization system as claimed in claim 1 wherein said tank is substantially larger than said slurry preparation compartment.

* * * * *